United States Patent Office 3,488,724
Patented Jan. 6, 1970

3,488,724
STARCH HYDROLYZATE EXTENDED HYDRO-
LYZED VINYL ESTER POLYMERIC SYSTEMS
Donald D. Donermeyer, Springfield, and Robert A.
Isaksen, East Longmeadow, Mass., assignors to
Monsanto Company, St. Louis, Mo., a corporation
of Delaware
No Drawing. Filed Mar. 3, 1967, Ser. No. 620,224
Int. Cl. C08b 25/02; C08f 25/00, 3/54
U.S. Cl. 260—17.4                           9 Claims

ABSTRACT OF THE DISCLOSURE

The application describes hydroxy-containing polymer systems which are extended up to levels of about 75 weight percent with non-crystalline starch hydrolyzates having a dextrose equivalent of from about 13 to about 38. The extended resin systems exhibit compatibiliy both in solution and in solid form and find utility as film formers, adhesives, binders and sizing compositions.

---

This invention relates to hydroxy-containing polymers extended with particular starch hydrolyzates.

Polyvinyl alcohol and other high molecular weight hydroxy-containing polymers have been modified with various additives such as clay, boric acid, metal salts, starch, urea, glycerine, and sugars in an effort to improve the properties of and increase the economic performance of polymers. However, in many cases, either the expense of the additives has prohibited their use commercially, or the additives have enhanced one property of the polymer only at the sacrifice of another property. Also, the quantity of such additives or level of extension of such polymers heretofore employed has been limited, i.e., less than about 25 weight percent because of incompatibility. It would be of course desirable to extend hydroxy-containing polymers to higher levels for economic reasons.

In many applications where hydroxy-containing polymers are utilized initially as as solution and then dried to a solid, compatibility of the additive with the polymer presents a major problem. Many additives, such as starch and low molecular weight saccharides, are dissolvable or dispersible in hot water but exhibit retrogradation with crystallization upon cooling. Thus, when the additives are used as high level extenders for hydroxy-containing polymers, the retrogradation of the additives upon cooling or during film formation yields two-phase films which have poor mechanical and physical properties.

Accordingly, typical objects of this invention are to provide: (1) novel extended hydroxy-containing polymer systems: (2) hydroxy-containing polymer systems containing more than 25 weight percent of an extender and which exhibit compatibility both in solution and in solid forms; and (3) a hydroxy-containing polymer system which possesses a combination of numerous specific desirable properties.

Other objects, aspects and advantages of this invention will become apparent to those skilled in the art upon further study of this disclosure and the appended claims.

In accordance with the present invention, the above objects are realized through the provision of a composition comprising a water-soluble hydroxy-containing polymer and up to about 75% by weight of a non-crystalline hydrolyzate of starch having a dextrose equivalent (hereinafter defined) of from about 13 to about 38, with or without other extenders or additives.

The present invention is based upon the discovery that particular hydrolyzates of starch, besides improving various properties of high molecular weight hydroxy-containing polymers, remain compatible with such polymers both in solution and in solid forms in a quantity of up to about 3 parts of hydrolyzate to 1 part of polymer.

The starch hydrolyzates applicable to this invention are non-crystalline and can be formed from any starch. The corn starch derivatives are presently preferred because of their commercial availability. The hydrolysis of corn starch to convert starch to dextrose is well known and is carried out by use of acid alone or by use of acid initially followed by enzyme hydrolysis. However, the conversion reaction may be regulated to produce intermediate hydrolyzates containing various amounts of intermediate products in the chemical path from starch to dextrose. The characteristics of a product as a hydrolyzate is expressed by a "D.E." number which is the ratio of "dextrose equivalent," or in other words, of reducing sugars, to the total dry substance of the hydrolyzate. Completely hydrolyzed corn starch is corn sugar or dextrose which has a 100 D.E. The commercial intermediate hydrolyzates of corn starch are termed [1] dextrins (<13 D.E.), maltodextrins (13 to <28 D.E.), and corn syrups (28 and higher D.E.). The corn syrups are further classed by degree of conversion, i.e. low (28 to <38 D.E.), regular (38 to <48 D.E.), intermediate (48 to <58 D.E.), high (58 to <68 D.E.) and extra high (68 and higher D.E.). Relative to colloidal starch, the hydrolyzates are non-colloidal compounds of small molecular size and are of such character that they may be dried to a powder. The starch hydrolyzates found operable and compatible with hydroxy-containing polymers in accordance with this invention are those termed malto-dextrins and low conversion corn syrups, i.e. having a D.E. ranging from about 13 to about 38.

The hydroxy-containing polymers applicable to this invention include the polymeric materials having a viscosity determined from a 4% aqueous solution at 20° C. up to about 200 centipoises and containing a plurality of recurring hydroxy groups either in the form of the alcohol or partially esterified alcohol.

More specifically, one group of hydroxy-containing polymers suitable for use in this invention are the (A) water soluble homopolymers of vinyl esters which are from 85 to 100% and preferably from 87 to 99% hydrolyzed; (B) water soluble hydrolyzed copolymers of at least 50 weight percent of a vinyl ester and up to 50 weight percent of an ethylenically unsaturated material copolymerizable therewith, such as ethylene, propylene, acrylates, vinyl chloride, maleates, fumarates, and the like or mixtures thereof; and (C) physical blends of (A) and (B). Examples of suitable hydroxy-containing polymers are polyvinyl alcohol, partially hydrolyzed polyvinyl acetate, partially hydrolyzed polyvinyl propionate, partially hydrolyzed polyvinyl butyrate, partially hydrolyzed polyvinyl stearate, partially hydrolyzed polyvinyl trifluoroacetate, and the like; partially hydrolyzed copolymers of vinyl acetate with ethylene, vinyl chloride, or acrylonitrile, and the like. Polyvinyl alcohol is the presently preferred polymer.

Further, in accordance with the present invention, other extenders and plasticizers for hydroxy-containing polymers, such as boric acid, urea, glycerine, and the like, may be employed in combination with the particular starch hydrolyzates set forth above as extenders for such polymers to advantage. Although such other extenders are not compatible alone with such polymers at extension levers above about 25 weight percent, it has presently been discovered that they do achieve compatibility with such polymers in the presence of particular starch hydrolyzates at high levels of total extension of the poly-

---

[1] Corn Syrups and Sugars, 3rd edition, 1965, Corn Industries Research Foundation, Inc., page 15.

mers. When a combination of extenders is employed, the particular starch hydrolyzates should comprise at least about 60%, by weight, of the total quantity of extenders employed which should not exceed about 75% by weight, of the composition.

The following examples are set forth to describe more fully the practice of this invention and the particular materials, quantities and conditions described should not be considered as limitations upon the inventive concept and scope thereof disclosed herein. Where parts are mentioned in this disclosure, they are parts by weight unless otherwise specified.

EXAMPLES

Films of polyvinyl alcohol employing different extenders at various levels of extension are prepared by casting aqueous solution admixtures of the materials onto a glass plate, the surface of which is coated with polyester film (polyethylene terephthalate). The films are dried at elevated temperatures (about 50° C.) to drive off water. The films are removed from the casting plate, subjected to about a 76% relative humidity and tested for tensile and elongation properties. The polymer, extender, ratio of extender to polymer and the test data for each film is given in Table 1.

The solutions are prepared by slurrying the polyvinyl alcohol and particular hydrolyzate in water and then heating the slurry until a solution is formed. The solutions using dextrin and starch are prepared by slurrying the extender in cold water and then cooking the slurry at 190° F.–210° F. until a constant viscosity is achieved. The latter two solutions are cast onto pre-heated glass plates to avoid retrogradation of the extender.

TABLE 1

| Test Film No.: | Polymer [1] weight, percent | Extender weight, percent | Tensile, lbs./sq. in. | Elongation, percent | Toughness [2] | Compatibility [3] of extender with polymer |
|---|---|---|---|---|---|---|
| 1 | 100 | | 6,600 | 320 | 21,000 | |
| 2 | 90 | [4] 10 | 4,960 | 300 | 15,000 | No. |
| 3 | 80 | [4] 20 | 3,720 | 200 | 7,500 | No. |
| 4 | 70 | [4] 30 | 3,900 | 160 | 6,400 | No. |
| 5 | 90 | [5] 10 | 4,950 | 370 | 18,300 | No. |
| 6 | 80 | [5] 20 | 4,660 | 340 | 15,600 | No. |
| 7 | 70 | [5] 30 | 4,110 | 390 | 15,000 | No. |
| 8 | 90 | [6] 10 | 5,030 | 300 | 15,200 | No. |
| 9 | 80 | [6] 20 | 4,030 | 270 | 11,000 | No. |
| 10 | 70 | [6] 30 | 2,450 | 160 | 4,000 | No. |
| 11 | 90 | [7] 10 | 5,300 | 430 | 22,600 | Yes. |
| 12 | 80 | [7] 20 | 4,400 | 340 | 14,900 | Yes. |
| 13 | 70 | [7] 30 | 3,640 | 350 | 12,800 | Yes. |
| 14 | 50 | [7] 50 | 2,800 | 660 | 18,500 | Yes. |
| 15 | 40 | [7] 60 | 2,020 | 580 | 11,700 | Yes. |
| 16 | 30 | [7] 70 | 1,220 | 630 | 7,700 | Yes. |
| 17 | 20 | [7] 80 | 400 | 390 | 1,600 | No. |
| 18 | 50 | [8] 50 | 1,870 | 630 | 11,800 | Yes. |
| 19 | 40 | [8] 60 | 1,310 | 600 | 7,900 | Yes. |
| 20 | 30 | [8] 70 | 720 | 520 | 3,700 | No. |
| 21 | 50 | [9] 50 | 1,310 | 570 | 7,500 | Yes. |
| 22 | 30 | [9] 70 | 800 | 550 | 4,400 | No. |
| 23 | 80 | [10] 20 | 4,000 | 450 | 18,000 | Yes. |
| 24 | 60 | [10] 40 | 1,800 | 540 | 9,700 | No. |
| 25 | 100 | | 4,500 | 440 | 18,000 | |
| 26 | 90 | [4] 10 | 1,680 | 350 | 5,900 | No. |
| 27 | 80 | [4] 20 | 1,270 | 320 | 4,200 | No. |
| 28 | 90 | [5] 10 | 2,500 | 350 | 8,800 | No. |
| 29 | 80 | [5] 20 | 3,150 | 250 | 8,000 | No. |
| 30 | 70 | [5] 30 | 2,750 | 260 | 7,000 | No. |
| 31 | 90 | [6] 10 | 2,750 | 280 | 7,600 | No. |
| 32 | 80 | [6] 20 | 3,500 | 230 | 8,000 | No. |
| 33 | 70 | [6] 30 | 2,150 | 130 | 2,700 | No. |
| 34 | 90 | [7] 10 | 3,540 | 380 | 13,400 | Yes. |
| 35 | 80 | [7] 20 | 3,200 | 380 | 12,000 | Yes. |
| 36 | 70 | [7] 30 | 3,050 | 480 | 14,600 | Yes. |
| 37 | 50 | [7] 50 | 2,770 | 450 | 12,500 | Yes. |
| 38 | 50 | [8] 50 | 2,400 | 500 | 12,000 | Yes. |
| 39 | 50 | [9] 50 | 1,800 | 600 | 10,800 | Yes. |
| 40 | 90 | [11] 10 | 2,060 | 570 | 11,700 | No. |
| 41 | 50 | [7] 45+[12] 5 | 2,600 | 630 | 16,300 | Yes. |
| 42 | 50 | [7] 40+[12] 10 | 2,150 | 520 | 11,200 | Yes. |
| 43 | 50 | [7] 35+[12] 15 | 1,660 | 480 | 8,000 | Yes. |
| 44 | 40 | [7] 50+[12] 10 | 1,470 | 470 | 7,000 | Yes. |
| 45 | 60 | [7] 30+[13] 10 | 2,430 | 640 | 15,500 | Yes. |
| 46 | 50 | [7] 35+[13] 15 | 1,730 | 610 | 10,500 | Yes. |
| 47 | 90 | [13] 10 | 1,700 | 600 | 10,200 | No. |

[1] The polymer employed in test films 1 through 24 is a 97.9–99% hydrolyzed polyvinyl alcohol having a viscosity of 45–55 centipoises determined at 20° C. from a 4% aqueous solution and is marketed by Monsanto Company as GELVATOL® 3-90. The polymer employed in test films 25 through 47 is an 88–89% hydrolyzed polyvinyl alcohol having a viscosity of 35–45 centipoises determined at 20° C. from a 4% aqueous solution and is marketed by Monsanto Company as GELVATOL® 20-90.

[2] Toughness is the product of tensile strength times elongation and is directly related to the amount of energy required to break the film.

[3] Compatibility means a clear solution, a transparent film and a combination of superior properties. The extended polymer systems are considered incompatible if a phase separation (clear upper-milky lower) occurs in solution; or if a solid film thereof is non-transparent, or shows the presence of crystallytes, or the extender exudes to the surface; or the properties of the systems are inferior.

[4] A corn dextrine having a D.E. of 8–8.5 and marketed by American Maize Products Co. as Amaizo 1413 Dextrine.

[5] A white dextrine having an 85–92% cold water solubility and 200–400 cps. viscosity determined from a 50% solution at 190°/75° F. and marketed by American Maize Products Co. as Amaizo 1415 Dextrine.

[6] An ethoxylated potato starch marketed by Morningstar Paisley Co. as Starfilm 3-95.

[7] A corn starch hydrolyzate having a D.E. of 18 and marketed by American Maize Products Co. as Frodex 15.

[8] A corn starch hydrolyzate having a D.E. of 24 and marketed by American Maize Products Co. as Frodex 24CN.

[9] A corn starch hydrolyzate having a D.E. of 36 and marketed by The Hubinger Co. as Dri Sweet.

[10] Sucrose.
[11] Lactose.
[12] Glycerine.
[13] Urea.

Although the novel composition provided by this invention has been described in the preceding specific examples in regard to the formation of the films, the composition is equally useful as adhesives particularly of the types known as corrugated and remoistenable, as binders in joint cement, as particle binders for temporary sands, forms or molds, and as a sizing composition for papers, textiles, yarns and filaments.

The novel composition of this invention may also be utilized to advantage with the presence of other known extenders or plasticizers. Typical examples of such are, but not limited to, urea, glycerine, metal salts such as magnesium chloride, magnesium sulfate, glycols, trimethylol propane, 1,3-butanediol, and the like.

One area in which the extended polymeric systems of this invention produce particularly superior results is in the sizing of synthetic and natural textile yarns and filaments. In preparing aqueous solution for use in sizing textile yarns, the vinyl ester homopolymers employed are at least 85% hydrolyzed having a viscosity determined from a 4% aqueous solution at 20° C. of from about 15 to about 200 centipoises, and the vinyl ester copolymers and physical blends of homopolymer and copolymer are sufficiently hydrolyzed to provide water-soluble systems. The exact degree of hydrolysis necessary in the vinyl ester to produce water-solubility will vary with the amount and solubility characteristics of the other polymeric constituent present. The aqueous sizing solution is applied to the textile yarn in amounts of 1–20 weight percent based upon the weight of the textile yarn. Textile yarns sized with the polymeric complexes of this invention exhibit excellent slasher performance and weaving efficiency with a minimum of warp stops, permitting efficient removal of the sized yarn from the slasher without yarn breakage.

Various modifications will be apparent to those skilled in the art from the preceding disclosure which may be made in or to the composition disclosed and which will not depart from the spirit and scope thereof.

What is claimed is:

1. A composition comprising:
   (A) from about 25 to about 75 weight percent of a first component comprising a water-soluble hydrolyzed vinyl ester polymer; and correspondingly
   (B) from about 75 to about 25 weight percent of a second component comprising a non-crystalline starch hydrolyzate having a dextrose equivalent of from about 13 to about 38;
   said weight percentages being based on the total weight of the composition.

2. The composition of claim 1 further being in an aqueous solution.

3. The composition of claim 1 wherein said polymer has a viscosity up to about 200 centipoises determined at 20° C. from a 4% aqueous solution of said polymer.

4. The composition of claim 3 wherein said polymer has a viscosity of from about 15 to about 200 centipoises.

5. The composition of claim 3 wherein said polymer is a vinyl ester polymer which is 85–100% hydrolyzed.

6. The composition of claim 5 wherein said polymer is a vinyl ester homopolymer which is 87–99% hydrolyzed.

7. The composition of claim 6 wherein said homopolymer is polyvinyl alcohol.

8. The composition of claim 1 further containing an additional extender in a quantity up to about 50%, by weight of said starch hydrolyzate, provided however that the total quantity of starch hydrolyzate and additional extenders does not exceed about 75% by weight of the total composition.

9. The composition of claim 8 wherein said additional extenders are selected from the group consisting of urea and glycerine.

References Cited
UNITED STATES PATENTS

| | | |
|---|---|---|
| 2,138,751 | 11/1938 | Vohren. |
| 2,399,456 | 4/1946 | Yates et al. |
| 3,044,974 | 7/1962 | Tanabe et al. |
| 2,179,607 | 4/1965 | Suda et al. |
| 3,219,613 | 11/1965 | Keene. |
| 3,222,306 | 12/1965 | Suzumura et al. |

WILLIAM H. SHORT, Primary Examiner

E. NIELSEN, Assistant Examiner

U.S. Cl. X.R.

117—139.5, 156, 161; 156—328